United States Patent Office 2,998,151
Patented Aug. 29, 1961

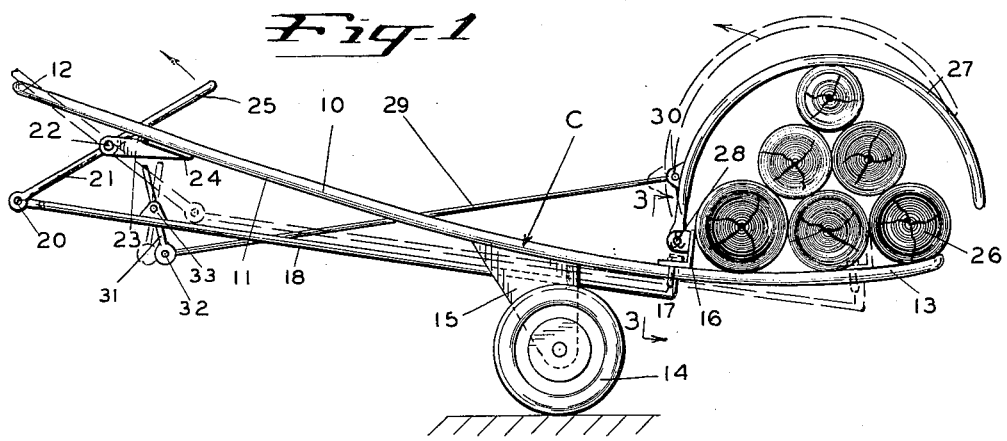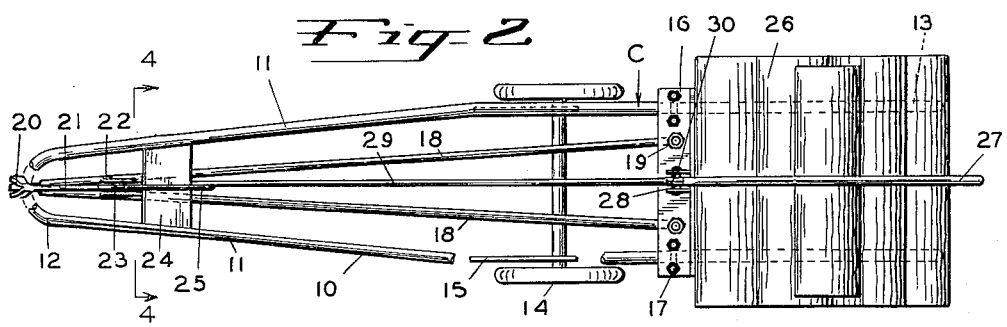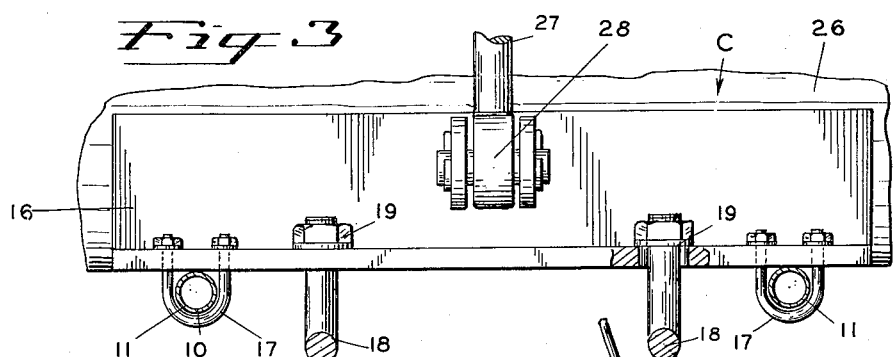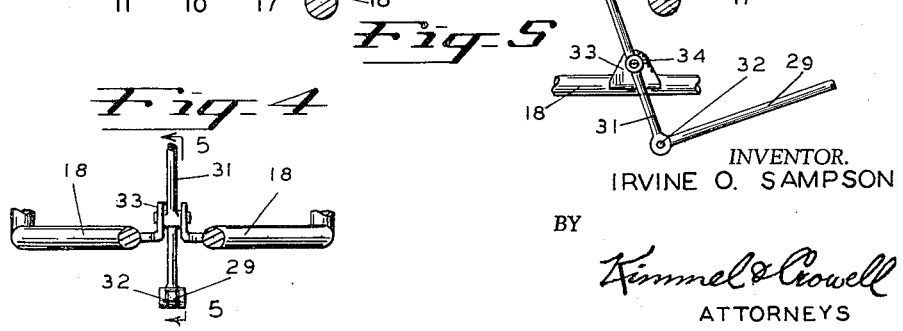
INVENTOR.
IRVINE O. SAMPSON

2,998,151
CARTS FOR MOVING LOGS INTO FIREPLACES
Irvine O. Sampson, Rte. 3, Box 86, Hood River, Oreg.
Filed Apr. 7, 1959, Ser. No. 804,707
1 Claim. (Cl. 214—511)

The present invention relates to carts for moving logs into fireplaces.

The primary object of the invention is to provide a wheeled cart for supporting logs and delivering them into fireplaces. In order to carry out this object, a framework is mounted upon wheels and has handles thereon controlling means connected therewith for holding the logs on the framework while moving the logs from place to place.

Another object of the invention is to provide a device of the class described above having a discharging element controlled by the operator of the cart for pushing the logs off the frame on to the andirons in the fireplace. The same device can be used for removing unburned logs from the fireplace.

Other objects and advantages will become apparent in the following specification when considered in light of the attached drawings, in which:

FIGURE 1 is a side elevation of the invention;

FIGURE 2 is a plan view of FIGURE 1, parts broken away for convenience of illustration;

FIGURE 3 is an enlarged fragmentary transverse sectional view, taken on line 3—3 of FIGURE 1, looking in the direction of the arrows; and FIGURE 4 is an enlarged fragmentary sectional view, taken on line 4—4 of FIGURE 2, looking in the direction of the arrows.

FIGURE 5 is a side view of FIGURE 4, taken on line 5—5.

Referring now to the drawings in detail wherein like reference characters indicate like reference parts throughout the several figures, the reference character C indicates generally a fireplace log cart constructed in accordance with the invention.

The cart C includes a frame 10 having a pair of spaced side rails 11 terminating in an integral handle 12 at one end and terminating in log supports 13 at their opposite ends. Frame rails 11 are supported by wheels 14 through bracket legs 15. Slidably mounted to the rails 11 is a transverse pusher bar 16 secured thereto by U-bolts 17.

Extending rearwardly towards the handle 12 is a pair of operating rods 18 having one end 19 loosely connected to the bar 16 and the opposite end connected by a pivot 20 to a lever 21. The lever 21 is pivotally connected at 22 to a bracket 23 forming part of a cross bar 24 mounted on the rails 11.

In the operation of the pusher bar 16, the operator grasps the end 25 of the handle 21 pulling the same towards him, which forces the pusher bar 16 forward along the supports 13 towards the log 26, forcing them off the ends of the supports 13 on to the andirons (not shown) within the fireplace.

A log hold down finger 27 is pivotally mounted at 28 to the pusher bar 16. An operating rod 29 is pivotally connected at 30 to the finger 27 and extends backward to the lever 31, connecting to the said lever at 32. The lever 31 is pivotally connected to the quadrant 33 forming part of the operating rods 18, moving in unison therewith on any movement of the said rods 18. The notches 34 hold the lever in either forward or rearward position, determined by the position of the hold down finger 27.

When the logs 26 are pushed by the pusher bar 16 off the ends of the supports 13, they fall from underneath the finger on to the fireplace andirons, or the fingers 27 may be raised by pulling backward on the rod 29 by way of the lever 31 by the operator, at the same time he is pushing the logs 26 off the supports 13. In the event it is desired to pull a log off the fireplace andirons to the supports 13, the lever 31 is manipulated raising and lowering the fingers 27 over the said log, pulling the same back with the forward finger in connection with the rod 29 controlled by the operating rods 18.

When the logs 26 are to be loaded on the supports 13, the operator pulls the lever 31 backward, raising the finger 27 to the broken line position, allowing the pushing of the said logs on the supports 13, FIGURE 1.

By raising or lowering the handle 12 of the device, the elevation of the logs 26 can be varied depending on how much clearance is necessary to load the same on to the andirons of the fireplace.

Having thus described the preferred embodiment of the invention, it should be understood that numerous structural modifications and adaptations may be resorted to without departing from the scope of the appended claim.

What is claimed is:

A log cart for the purpose described comprising a tubular frame member of generally U-shape, the bight portion of said member constituting a handle and the legs of said member diverging from the bight portion to a point substantially midway the length thereof, with the remaining end portions of the legs being substantially parallel and curved upwardly in a broad arc to define a log receiving support, wheel carrying brackets fixed to said legs adjacent the juncture of said divergent and parallel portions thereof, a pusher device slidably disposed upon and transversely of said parallel portions of said frame member, straps each looped around one of said parallel leg portions and secured to said pusher device, a first lever disposed between the legs of said frame member adjacent the bight thereof, a linkage connecting said first lever and said pusher bar, an arcuate hold down member pivoted at one end centrally of said pusher device, a second lever pivoted between the legs of said frame member near the bight thereof, and a linkage connecting said last named lever and said hold down member at a point spaced from the pivot of the latter.

References Cited in the file of this patent
UNITED STATES PATENTS

| | | |
|---|---|---|
| 901,532 | Gillum | Oct. 20, 1908 |
| 2,447,300 | Williams | Aug. 17, 1948 |
| 2,493,397 | Fourman | Jan. 3, 1950 |
| 2,496,079 | Wessman | Jan. 31, 1950 |
| 2,609,950 | Chambers | Sept. 9, 1952 |
| 2,828,878 | Le Tourneau | Apr. 1, 1958 |